United States Patent [19]

Nijhuis

[11] 4,452,178

[45] Jun. 5, 1984

[54] DRIVE CORRIDOR FOR SLAUGHTER CATTLE

[75] Inventor: Gerrit J. Nijhuis, Winterswijk, Netherlands

[73] Assignee: Machinefabriek G.J. Nijhuis B.V., Netherlands

[21] Appl. No.: 407,309

[22] Filed: Aug. 11, 1982

[30] Foreign Application Priority Data

Aug. 14, 1981 [NL] Netherlands .......................... 8103823

[51] Int. Cl.³ ............................................. A01K 29/00
[52] U.S. Cl. .......................................... 119/20; 119/82
[58] Field of Search .................. 119/20, 82, 27, 14.03, 119/14.04

[56] References Cited

U.S. PATENT DOCUMENTS

| 286,575 | 10/1883 | Barnes | 119/82 |
| 2,691,359 | 10/1954 | Anstiss et al. | 119/20 |
| 3,703,884 | 11/1972 | Maddalena et al. | 119/27 |
| 3,799,115 | 3/1974 | Fullerton et al. | 119/20 |
| 3,805,741 | 4/1974 | Thompson et al. | 119/20 |
| 3,908,599 | 9/1975 | Flocchini | 119/20 |
| 4,006,714 | 2/1977 | Goossen | 119/20 |

Primary Examiner—Hugh R. Chamblee
Attorney, Agent, or Firm—Arnold, White & Durkee

[57] ABSTRACT

Drive corridor for slaughter cattle said drive corridor having a straight side wall 1 and an opposite side wall 2 provided with steps 3, 4 such that the width of the drive corridor stepwise decreases to the width of one animal, said drive corridor according to the invention having a fence 10, 11, 12 movable in the forcing up direction and comprising fence parts 10, 11 and 12 swingably supported from transverse rods or shafts 13, 14, 15 and each part 10, 11, 12 having the width of a drive corridor step, said shafts 13, 14, 15 having wheels 16, 17, 18 for moving the fence. According to the invention endless chains 9 can be provided for moving the shafts 13, 14, 15 said chains having means such as pawls 22, 23 which can engage the shafts 13, 14, 15 and disconnect the shafts 13, 14, 15 from the chains 9.

7 Claims, 5 Drawing Figures

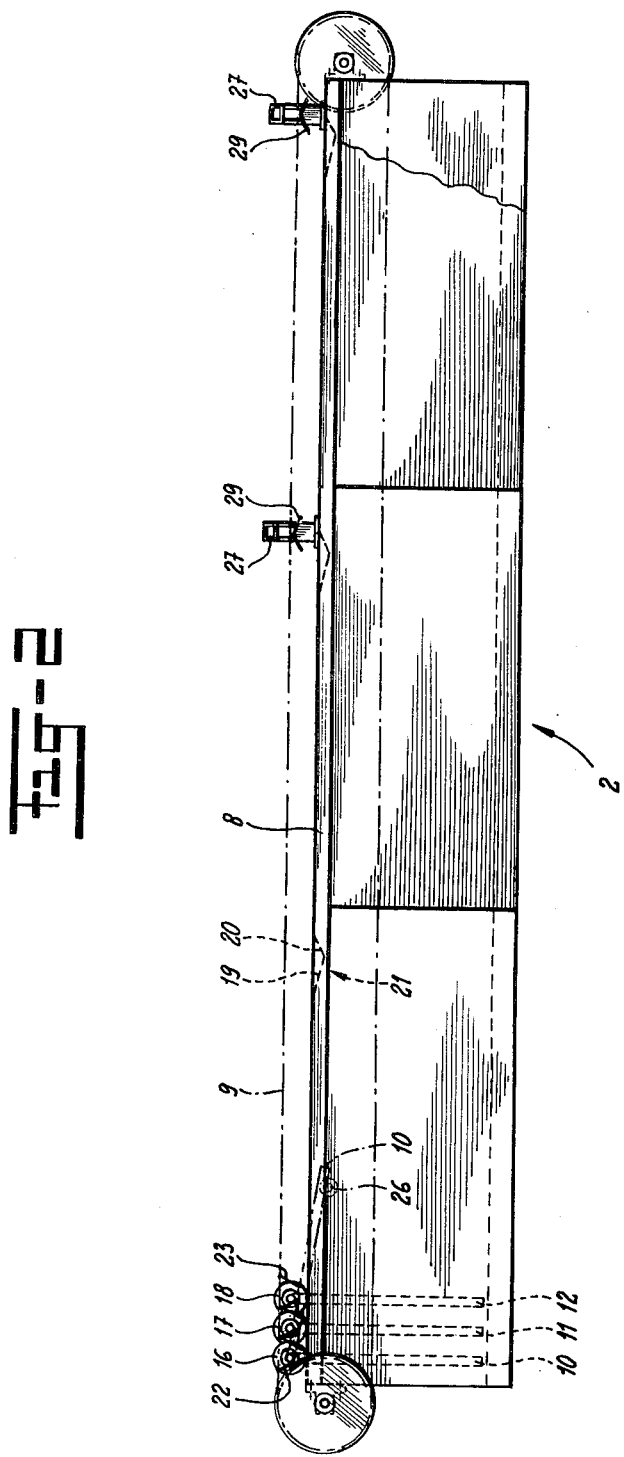

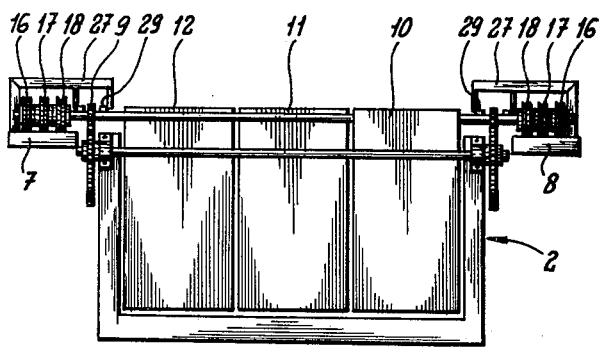
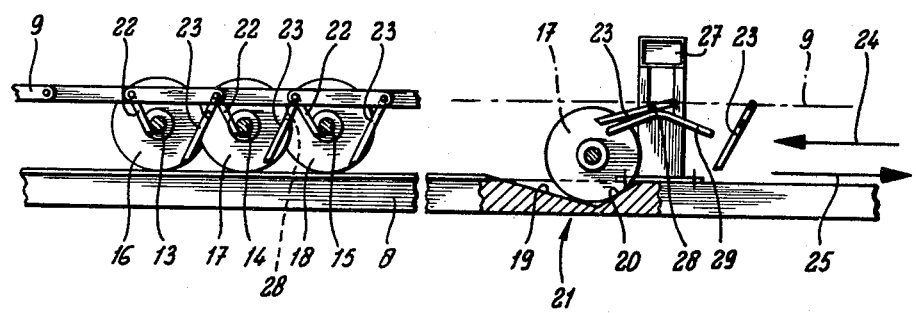
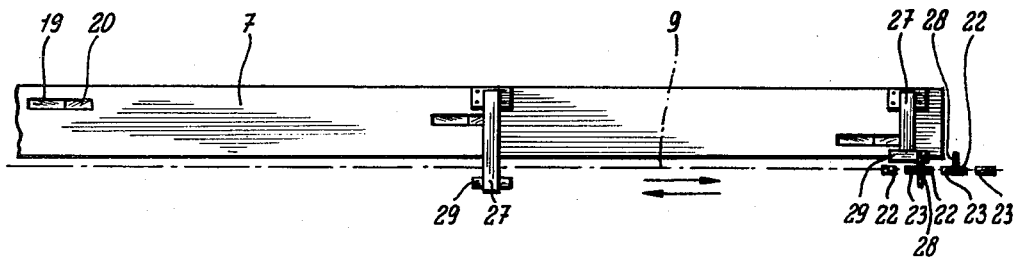

DRIVE CORRIDOR FOR SLAUGHTER CATTLE

The invention relates to a drive corridor for slaughter cattle, which corridor has at one side a continuing straight wall, and at the opposite side a wall staggering stairwise inwardly in the direction of forcing up such, that the initial width of several animals decreases every time with the width of one animal until at last only the width of one animal remains.

Such a drive corridor is generally known. These drive corridors are between the stables or receiving areas and the stunning apparatus and serve to take care that the animals to be stunned and then to be slaughtered, are delivered to the stunning device in a single row behind each other.

At these known drive corridors, the forcing up proceeds manually, possibly sustained by a so called stimulating electrode. This is disturbing to the animals and the possible resulting stress can influence the ultimate quality of the meat.

It is the object of the invention to mechanize the forcing up of slaughter cattle.

This object is realized in accordance to the invention by providing the corridor with a fence shaped forcing up device comprising substantially transverse placed side by side fence members with the width of a stair and by providing means for moving the fence in the direction of forcing up and each fence member being disconnectable at the end of its stair or corridor length. This fence which can be moved stepwise if necessary, thus decreasing continuously decreases the space for the animals such that these are forced up in a calm way, each fence member being disconnected at the end of its track. In this way rousing the cattle is out of the question. This disconnection can be realized in several ways. So one can use means, such as guiding tracks, by which the fence members are lifted. It is most simple when each fence member loses the connection with the drive members at the end of its path and so stops while the other members are still moving on.

In accordance to the invention this can be realized in a simple way by providing the endless chains at both sides of the drive corridor with carrying members, each fence member being suspended to an axle or rod, which extends in transverse direction above the corridor and has wheels at its extremities which run on rolling tracks and the carrying members disconnectable engaging said axle or rod and means are provided for operating the coupling between the carrying members and the axles. The fence members thus are so hanging on the axles or rods, which are each individually displaceable by means of said endless chains. At the end of the path of each fence member the connection is broken and the related fence member stops, while at the return of the chains these fence members are carried on again. One can make use for this purpose of carrying members formed like disconnectable pawls on the chains, which are being disconnected where a fence member has to stop by known means.

A structural simple solution is obtained when each fence member is suspended to an own axle with wheels, the rolling tracks for the wheels of each axle being situated side by side and forming pairs with the tracks of each pair on both sides of the corridor and each rolling track of a pair having a hole or recess on the spot of one stair, in which hole or recess a wheel can enter and can be stopped and the chains can be provided with short carrying pawls, which in the direction of forcing up can engage axles of which the wheels are free of the hole and can move around it in opposite direction on the spot of the axles as well as with long one way swingable pawls, which can swing away at movement of the chains in the direction of forcing up and can engage in the opposite direction on axles of which the wheels are in the holes, controlling members being provided to make sure that the right pawl engages the right axle. In this way a simple displacement of fence members in the direction of forcing up is achieved wherein each fence member just before reaching the cross wall forming the stair, comes in the position in which it is not carried on, while at the returning movement of the chains it can however be returned to the initial position.

In that case it will be necessary that there are some controlling members on the spot of some holes for disconnecting those pawls which have to be able to pass the not related axle.

Other structures are of course also imaginable like for instance a single axle to which different fence members are pivotely affixed, at which a fence member meeting a cross wall forming step, always swings up until into the horizontal position and keeps supporting in that position on the wall extending in the direction of movement. At the return movement of the axle with wheels these fence members then automatically fall back in the vertical position as soon as they lose the support of the longitudinal extending wall on the spot of their step. This single axle with wheels to which for instance three fence members are suspended does not have to be displaced by chains. This can occur by every suitable means.

The free swingable fence members suspended on this axle, only close the corridor to the rear side by their own weight. At the forcing up it is however sufficient that these fence members, even in case of lifting up by the pressing of an animal, tap every time against an animal and force it up in this way.

In order to be able to fill the drive corridor, the fence members have to be disconnectable at the wide entrance of it. This can be achieved in a simple way by hanging up the fence members pivotely around horizontal axles and to lift them up during the return movement by a guiding track until they are in an almost horizontal position. This guiding track, for which a pin is sufficient, can then be disconnectable, such that the fence members fall down in the vertical position as soon as these guiding means are disconnected. In case of sufficient space this is also achievable during the forcing up movement in which case the guiding tracks can be rigid. The pivotable movement can be unidirectional, such that during the forcing up no swinging through to the other side can occur.

The invention will now be explained referring the drawings.

FIG. 2 is a side view.

FIG. 3 is an end view from the left to the right of FIG. 2.

FIG. 4a and 4b show details.

FIG. 5 is a part of FIG. 1.

Figure 1:
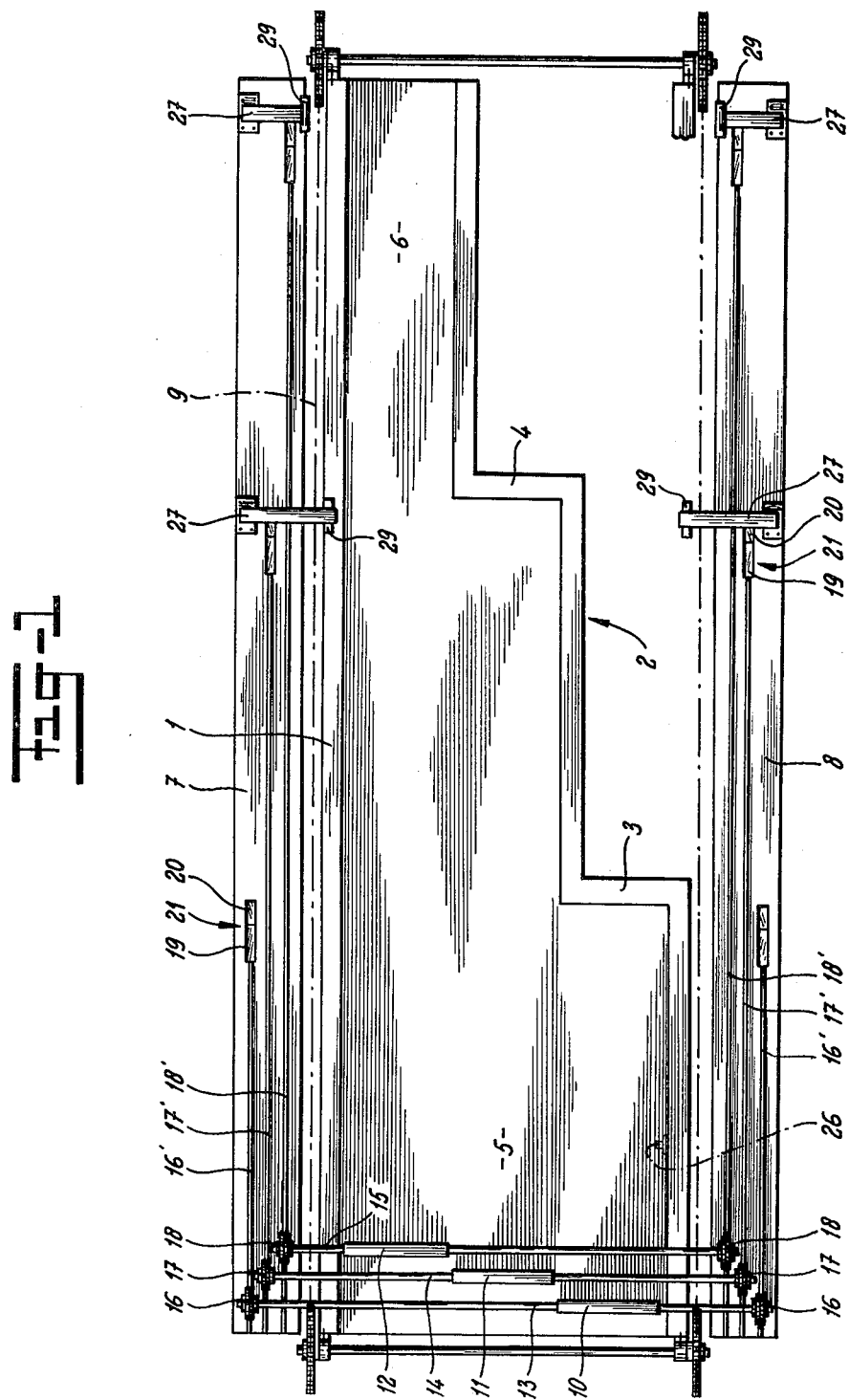
FIG. 1 is a plan view of the drive corridor according to the invention.

FIG. 1 shows a drive corridor comprising a straight side wall 1 and an opposite positioned side wall 2, provided with two stairs 3 and 4. At the entrance side 5 the corridor has a width of three animals, for instance three pigs, and at the exit side 6 a width of one animal.

On both sides of the corridor tracks 7 and 8 are placed as well as endless chains, as referred in FIG. 2 at 9.

The forcing up fence comprises fence members 10, 11 and 12. Each fence member is suspended to a rod 13, 14 and 15 respectively, and each rod 13, 14 and 15 respectively has at its extremity wheels 16, 17 and 18. On the tracks or walls 7 and 8 rolling tracks 16', 17' and 18' are situated side by side, of which the rolling tracks 16' serve to guide the wheels 16 of the axle 13, the rolling tracks 17' to guide the wheels 17 of the axle 14 and the rolling tracks 18' to guide the wheels 18 of axle 15.

The pair of rolling tracks 16' has a hole 21 at a short distance in front of the stair 3, which, as shown most clearly in FIG. 4, comprises a downward running face 19 and an upward running steeper face 20. The rolling tracks 17' have corresponding holes on the spot of stair 4 and the rolling tracks 18' can, as far as still required, at the end of the corridor also be provided with similar holes.

The chains 9 comprise links provided with short pawls 22 and long pawls 23. The short pawls 22 can swing away anti-clockwise and pawls 23 can swing away clockwise from the shown position. If the chains move according to FIG. 4 in the direction of the arrow 25, being the direction of forcing up, then the pawls 22 can so carry the axles 13, 14 and 15, until the wheels of an axle enter a hole 21 after which the axle gets out of the range of pawls 22.

If the chains move in opposite direction, thus according to the arrow 24, then the long pawls 23 will be able to catch and carry the axle of which the wheels rest in a hole 21 and so return them with the corresponding fence member to the initial position.

By installing sufficient pawls 22, 23 respectively, the corresponding axles can be positioned and returned.

It is of course necessary that the right pawl carries the right axle, which means that other long pawls 23 are lifted over the axle of the corresponding fence. This is achieved by providing a controlling device 27 on the spot of holes 21 at the end and on the spot of the stairs of the corridor, with exception of the first stair, said controlling device being situated one time at the left hand side and one time at the right hand side of the chain 9. The long pawls have transverse pins 28 which run against the cam or wing 29 of the controlling device 27, such that the pawl 23 is lifted and moves over the not carryable axle as shown in FIG. 4b.

At the returning movement only the pawl 23 shown in FIG. 4a at the right hand side, has to engage the axle 15 and the other pawls 23 are lifted over this axle. On the spot of the axle 14 resting in the hole situated in the middle, only the pawl 23 situated at the left hand side has to be lifted over this axle.

It can be desired at the returning movement to take care of automatically swinging up of the fence members at the end of this movement. Said swinging up can be achieved by placing a pin or cam in the side wall for instance at 26, and to permit the fence members swinging up. The entrance will then be opened automatically, in which case one can provide fence 10 taking along fence 11.

If it is desired, to limit the pivotal movement of the fence members to make a swinging through in opposite direction impossible, this can be attained with a suitable hinging structure which only allows a movement around a limited angle.

It is however also imaginable that the forcing up is only achieved by the weight of the fence members, in which case these can be suspended free swingeable to the corresponding axles or rods.

According to a not shown alternative the fence members 10, 11 and 12 can all be suspended on one single axle, said axle is drivable over the walls 7 and 8. The fence members 10 and 11 then have such a width, that they rest with an edge on parallel to the wall extending walls after reaching the transverse wall 3, 4 respectively, after being swung up.

I claim:

1. A drive corridor for slaughter animals, comprising:
   a corridor having at one side a continuous straight wall and having at the opposite side a wall that is staggered stairwise longitudinally in the direction of forcing along, such that the initial width of the corridor is the width of several animals, and the width of the corridor decreases at staggered stair locations by a distance approximately equal to the width of one animal, until at the end of the corridor, the corridor has a width of only one animal;
   the corridor being provided with a fence shaped forcing along device, the forcing along device including a plurality of side by side fence members placed substantially transversely with respect to the direction of forcing along, the fence members having a width substantially equal to the width of a stair, the forcing along device being supported for movement in the direction of forcing along;
   drive means being provided to displace the fence members in the direction of forcing along;
   and each fence member being disconnectably coupled to the drive means so that movement of a fence member may be stopped at the location where said fence member reaches the stair associated with said fence member.

2. A drive corridor according to claim 1, wherein said forcing along device is moveable stepwise whereby each fence member is moveable in the direction of forcing along until it reaches the stair associated with it, such that the first fence member stops when it reaches its stair, while the other fence members continue moving until they each reach their respective stair.

3. A drive corridor according to claim 1 or claim 2, wherein the fence members are hingedly suspended from rods in such a way that the fence members can swing up in the direction of forcing along, and actuation members situated near the entrance of the drive corridor to bring about such swinging up of the fence members in order to allow passage of animals into the corridor.

4. A drive corridor according to claim 1 or claim 2, further comprising drivable endless chains the endless chains having carrying members connected thereto, a plurality of rods, each fence member being suspended from a rod, said rods extending transversely above the corridor, said rods having wheels at the rods' extremities, the wheels being adapted to run over rolling tracks, said carrying members being adapted to disconnectably engage the rods one at a time; and
   means for controlling the connection between said carrying members and said rods.

5. A drive corridor according to claim 4, wherein the fence members are hingedly suspended from the rods in such a way that the fence members can swing up in the direction of forcing along, and actuation members situated near the entrance of the drive corridor to bring about such swinging up of the fence members in order to allow passage of animals into the corridor.

6. A drive corridor according to claim 4, wherein each fence member is suspended from a separate rod with wheels;
   the wheels for each axle being positioned to correspond with two of the rolling tracks, the two rolling tracks corresponding with a rod being positioned on opposite sides of the corridor, each rolling track having a recess located to correspond with the stair associated with the fence member suspended from the rod, such that when the wheels of the rod enter the recess in the rolling track associated with such wheel, the wheel and rod will drop to a location sufficient to disengage said rod from the carrying members on the endless chains, thereby stopping movement of the rod and the fence member suspended therefrom when the fence member reaches the stair associated with such fence member;
   the carrying members on the endless chains including short carrying pawls which can engage rods in the direction of forcing along;
   the carrying members further including long unidirectional pawls rotatably connected to the endless chains which are long enough to engage the rods when the wheels of the rods have dropped into a recess in a rolling track, the long pawls being adapted to engage a rod when the long pawls are moving in a direction opposite to the direction of forcing along and to move the rod in a direction opposite to the direction of forcing along, the long pawls being adapted to swing away when the long pawls contact the rods during movement of the long pawls with the endless chains in the direction of forcing along, and said means for controlling the connection between carrying members and rods comprising controlling members placed near a recess in a rolling track to control the engagement of the desired long pawl on the desired rod.

7. A drive corridor according to claim 4, wherein the fence members are hingedly suspended from the rods in such a way that the fence members can swing up in the direction of forcing along, and actuation members situated near the entrance of the drive corridor to bring about such swinging up of the fence members in order to allow passage of animals into the corridor.

* * * * *

UNITED STATES PATENT AND TRADEMARK OFFICE
CERTIFICATE OF CORRECTION

PATENT NO. : 4,452,178
DATED : June 5, 1984
INVENTOR(S) : Gerrit J. Nijhuis

It is certified that error appears in the above-identified patent and that said Letters Patent is hereby corrected as shown below:

In claim 7, first line, change the numeral "4" to -- 6 --.

Signed and Sealed this

*Twenty-seventh* Day of *November 1984*

[SEAL]

*Attest:*

GERALD J. MOSSINGHOFF

*Attesting Officer*   *Commissioner of Patents and Trademarks*